US008022316B2

(12) United States Patent  
Trautweiler et al.

(10) Patent No.: US 8,022,316 B2  
(45) Date of Patent: Sep. 20, 2011

(54) METHOD FOR DETERMINING A CONDITION OF A WEIGHING DEVICE BY MONITORING THE VOLTAGE OF A COMMUNICATIONS LINE

(75) Inventors: Christoph Trautweiler, Regensdorf (CH); Douglas Bliss, Worthington, OH (US)

(73) Assignee: Mettler-Toledo AG, Greifensee (CH)

( * ) Notice: Subject to any disclaimer, the term of this patent is extended or adjusted under 35 U.S.C. 154(b) by 0 days.

(21) Appl. No.: 12/632,310

(22) Filed: Dec. 7, 2009

(65) Prior Publication Data

US 2010/0078228 A1   Apr. 1, 2010

Related U.S. Application Data

(63) Continuation of application No. PCT/EP2008/053622, filed on Mar. 27, 2008.

(60) Provisional application No. 60/942,475, filed on Jun. 7, 2007.

(51) Int. Cl.
| | |
|---|---|
| G01R 27/02 | (2006.01) |
| G01R 31/02 | (2006.01) |
| G08B 29/00 | (2006.01) |
| G01G 23/01 | (2006.01) |

(52) U.S. Cl. ............. 177/25.13; 324/537; 324/609; 340/514; 340/653; 714/43; 177/50; 702/101; 702/173

(58) Field of Classification Search ............ 714/43; 324/522, 523, 527, 537, 609; 177/50, 25.13; 340/514, 653; 702/101, 102, 173  
See application file for complete search history.

(56) References Cited

U.S. PATENT DOCUMENTS

| 4,804,052 | A | * | 2/1989 | Griffen | 177/25.14 |
|---|---|---|---|---|---|
| 4,815,547 | A | * | 3/1989 | Dillon et al. | 177/25.14 |
| 4,951,283 | A | * | 8/1990 | Mastrocola et al. | 714/43 |
| 5,135,062 | A | | 8/1992 | Lockery et al. | |
| 5,193,177 | A | * | 3/1993 | Burri | 714/43 |
| 5,296,655 | A | * | 3/1994 | Sargent et al. | 177/199 |
| 5,606,516 | A | * | 2/1997 | Douglas et al. | 702/104 |
| 5,765,031 | A | * | 6/1998 | Mimuth et al. | 714/43 |
| 5,780,782 | A | * | 7/1998 | O'Dea | 177/136 |
| 5,789,925 | A | * | 8/1998 | Yokotani et al. | 324/500 |
| 6,040,779 | A | * | 3/2000 | Pfaff et al. | 340/661 |
| 6,249,127 | B1 | * | 6/2001 | Fluhrer | 324/543 |
| 6,505,310 | B1 | * | 1/2003 | Brown et al. | 714/43 |
| 6,518,880 | B2 | * | 2/2003 | Tanizawa | 340/514 |
| 6,566,613 | B1 | | 5/2003 | Gesuita et al. | |
| 6,639,156 | B2 | | 10/2003 | Luke et al. | |

(Continued)

FOREIGN PATENT DOCUMENTS

DE   10150641 A1   10/2002

(Continued)

*Primary Examiner* — Randy W Gibson  
(74) *Attorney, Agent, or Firm* — Standley Law Group LLP

(57) ABSTRACT

A force measuring device, especially a weighing device, has at least one force-measuring module that includes a force-measuring cell, a communication means, a terminal and at least one communication line, through which communication signals are transmitted between the terminal and the communication means. In a method for determining the condition of such a device, at least one voltage present at the communication line or at the communication means is measured. The measured value, or a processed result therefrom, are transmitted through the communication line to the terminal. A parameter representing the condition of the force-measuring device is determined from the measurement value, or the processed result, in an accurate and simple manner.

24 Claims, 6 Drawing Sheets

U.S. PATENT DOCUMENTS

| | | |
|---|---|---|
| 6,693,372 B2 * | 2/2004 | Swart et al. ............... 307/125 |
| 6,919,516 B2 | 7/2005 | Frye et al. |
| 6,940,290 B2 * | 9/2005 | Ishida .......................... 324/609 |
| 7,151,230 B2 | 12/2006 | Brighenti |
| 7,349,479 B2 * | 3/2008 | Suganuma et al. ........... 375/257 |
| 7,361,851 B2 * | 4/2008 | Brighenti ................. 177/25.13 |
| 7,620,506 B2 | 11/2009 | Kuwayama et al. |
| 7,752,503 B2 * | 7/2010 | Wang .............................. 714/48 |
| 2003/0164711 A1 * | 9/2003 | Ishida .......................... 324/610 |
| 2005/0072605 A1 * | 4/2005 | Kunzi et al. ................... 177/126 |
| 2010/0084199 A1 * | 4/2010 | Bucher et al. ............. 177/25.13 |

FOREIGN PATENT DOCUMENTS

DE            102004001909 A1     8/2005

* cited by examiner

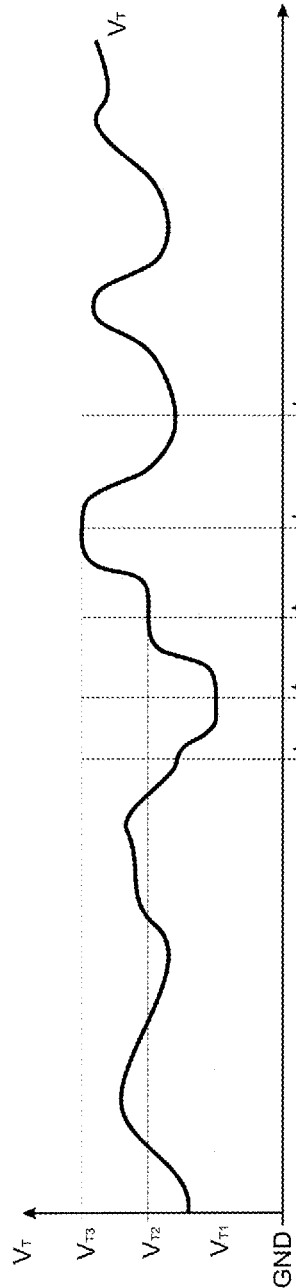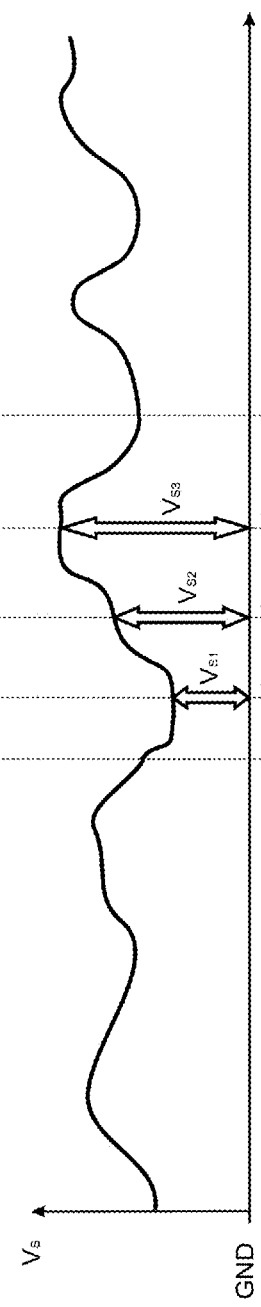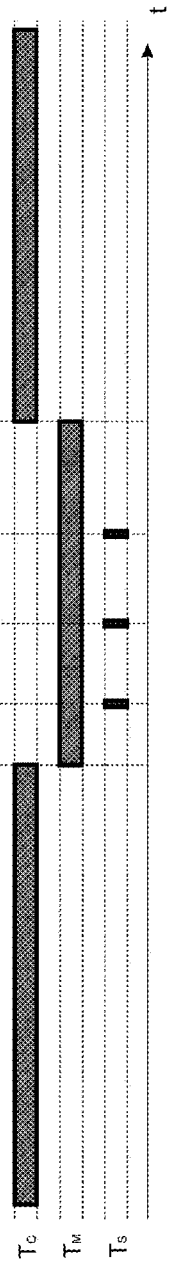

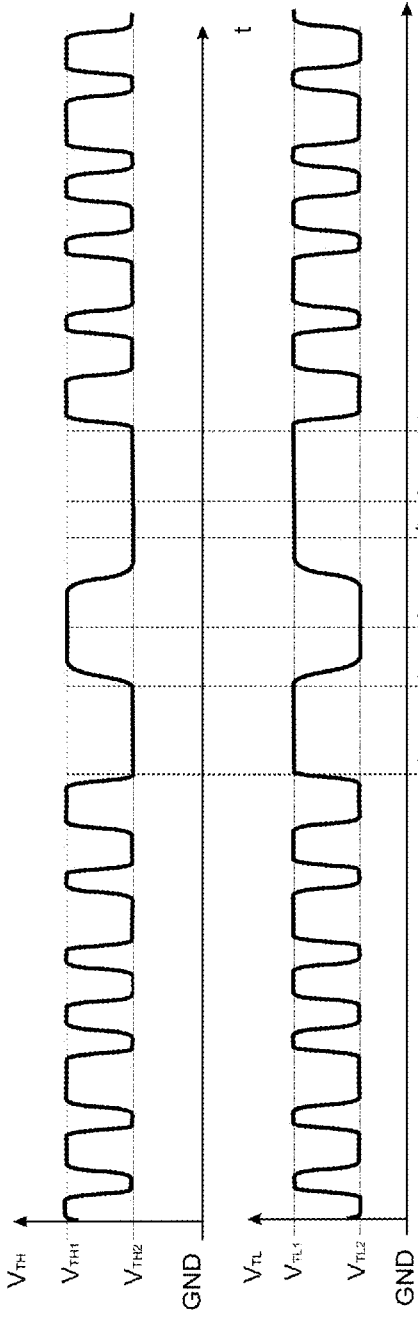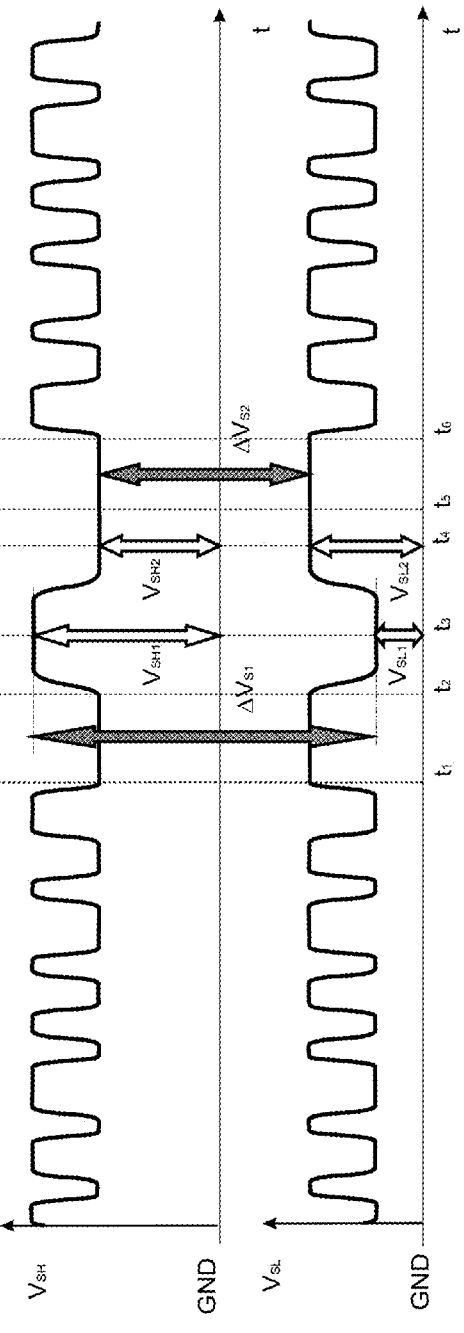
Fig. 4a
Fig. 4b

METHOD FOR DETERMINING A CONDITION OF A WEIGHING DEVICE BY MONITORING THE VOLTAGE OF A COMMUNICATIONS LINE

CROSS-REFERENCE TO RELATED APPLICATIONS

This application is a continuation under 35 USC §120 of PCT/EP2008/053622, filed 27 Mar. 2008, which is in turn entitled to benefit of a right of priority under 35 USC §119 from U.S. provisional application 60/942,475, filed 7 Jun. 2007. The content of each of the applications is incorporated by reference as if fully recited herein.

TECHNICAL FIELD

The disclosed embodiments relate to a method of monitoring and/or determining the condition of a force-measuring device, in particular a weighing device, as well as to a force-measuring device that is operable to carry out the method, and a force-measuring module that is operable to carry out the method.

BACKGROUND OF THE ART

Under the definition used herein, a force-measuring device includes a force-measuring module and an indicator device. The force-measuring module, in turn, includes an electromechanical force-measuring cell serving to determine a force, which functions as a measurement converter in that it converts the input quantity, which is a mechanical force, into an electrical output signal. A special type of multiple force-measuring device exists in the form of a weighing scale with one or more weighing devices, so-called weighing modules. The force-measuring cell is configured in this case as a weighing cell and serves for the mechanical-to-electrical conversion whereby the weight force exerted by a weighing object is converted into an electrical signal. In particular, the weighing cell of a weighing scale serves for the mechanical-to-electrical conversion whereby the weight force exerted by a weighing object is converted into an electrical signal. A force-measuring module or a weighing module as the term is understood here means, respectively, a force-measuring device or a weighing scale without an indicator device.

Larger force-measuring devices often consist of a plurality of force-measuring modules. The force to be measured is in this case distributed by a mechanical device, in particular a measuring plate, over a plurality of force-measuring modules. Each force-measuring module in this arrangement includes a force-measuring cell, by means of which the portion of the force that is imparted to the respective module can be individually determined. The results from the individual force-measuring cells are then passed on to a common output device, where they are combined into an overall result.

Multiple force-measuring devices of this type are used for example in industrial installations for the weighing of the contents of basins, tanks, reactor vessels and the like. Typically in these kinds of applications the weighing modules are configured as high-capacity weighing modules, as so-called tank weighing cells or reactor vessel weighing cells. For each container to be weighed, a plurality of weighing modules are arranged between the feet of the container and the foundation. Thus, each foot of the container rests on a force-measuring module. In order to determine the weight of the container and/or of its contents, the measurement values determined by the force-measuring modules need to be added up, as each measurement value represents a part of the mass. This calculation is in most cases performed in a processor device and/or controller device set up in an adjacent location.

High-capacity force-measuring cells also find application as weighing modules in weighing scales for trucks. Truck scales typically have several measuring plates or weighing plates, each of which rests on a plurality of force-measuring modules. Accordingly, each force-measuring module measures a partial weight of the truck and/or of one or more trailers. The measuring results of the individual force-measuring modules are transmitted to the terminal where they are processed further. The terminal is typically located at some distance from the force-measuring modules, for example in a controller device located as much as several hundred meters away.

According to published application US 2004/0245026 to Brighenti, the terminal, referred to as weighing terminal, is equipped with a display through which the results of the force-measuring device can be released to the outside. In addition, the terminal supplies the force-measuring device with electrical power, with all force-measuring modules being served with electric current from this central power supply. For the transmission of the measurement results and to transmit the electric current, the force-measuring modules are connected to the terminal through various cables. In this connection, the delivery of electrical current and the transmission of the measurement results are channeled through the same cables.

As a cabling arrangement, the individual force-measuring modules are connected by shorter distributor lines to a distribution device, and only the latter has a direct connection through an individual cable, the so-called "home-run" cable, directly to the terminal. The power supply and the transmission of the measurement values are thus merged in the distribution device in order to avoid multiple parallel cables.

The electrical connection of the force-measuring modules through distributor lines and distribution devices increases the risk of installation errors in the setup and in case of repairs leads to a difficult and lengthy process of pinpointing the location of an error. Thus, the requirement exists in particular in larger installations for a simple and efficient way of monitoring the condition of the force-measuring device during operation and installation.

A distribution device is presented in published application DE 101 50 641, in which the condition of the voltage supply, current loops, polarity, and breaks in cables are indicated by means of light-emitting diodes. This device allows a failure diagnosis of the most important malfunctions, but has the disadvantage that this mode of indication does not provide exact quantifiable data about possible functional failures. For example, it is possible for the indication to signal a correct voltage of the power supply, even if the housing or the plug connection of the cables has already been penetrated by moisture. It is therefore possible that corrosion sets in, which in time can lead to the complete destruction of the force-measuring module, although no change can be noticed in the conditions of the voltage supply, loop current, polarity and breakage of a cable.

As a further disadvantage, the monitoring of the optical indication has to take place at the location of the measuring plates. This involves relatively large expenditures for personnel, particularly for large installations and/or in case of inaccessible distribution devices.

It is an objective, therefore, to propose a method for determining the condition of a force-measuring device, a suitable force-measuring device, and a suitable force-measuring module, in particular a weighing device and a weighing module, which allow the condition of the force-measuring device to be determined in a more precise and simple way.

SUMMARY

This objective is met by a method of monitoring the condition of a force-measuring device, a force-measuring device, and a force-measuring module which have the features specified in the independent claims. Advantageous embodiments are presented in additional, dependent claims.

The method involves determining the condition of a force-measuring device, particularly of a weighing device, with at least one force-measuring module that includes a force-measuring cell and a communication means, with a terminal and with at least one communication line through which communication signals can be transmitted between the communication means and the terminal. Under this method, the electrical voltage of the at least one communication line is measured at least once during operation of the force-measuring device with a voltage sensor, whereby at least one measurement value is generated. The at least one measurement value and/or results based on processing of the latter, are transmitted through the at least one communication line to the terminal and/or to the communication means of a further force-measuring module, and used to determine a parameter of the condition of the force-measuring device. As these voltage values of the communication lines are very sensitive in their reaction to disturbances, the causes of the disturbances can be determined very accurately. Furthermore, the measurement values are brought together in the terminal, whereby a comparative analysis of the measurement values is made possible, leading to meaningful results and/or a complex, multi-layered status analysis. Accordingly, the condition of the force-measuring device can be determined very precisely. The method is in particular not limited to diagnostic conclusions about errors, but also provides prognostic information regarding the development of the condition that can be expected in the future. The planning of service and maintenance activities is thereby facilitated to a substantial extent. Since the measurement values and/or the results obtained from processing them are transmitted to the terminal where they are centrally collected and processed, the status-monitoring can be carried out in a simple way.

The voltage sensor of the force-measuring device and/or of the force-measuring module is configured so that the voltage of the at least one communication line is measurable during operation. This makes it possible to monitor the condition of the force-measuring device continuously without interruption.

The measurement value established from this can be an analog quantity, for example a voltage, or of a digital format, for example a numerical value. In addition, the term "measurement value" also encompasses the continuous time profile of a measurement, the so-called measurement signal. This measurement signal, likewise, can be an analog quantity, for example a signal profile, or of a digital format, for example a series of numerical values.

In a further embodiment, the communication signals are transmitted by means of a bus system, in particular a CAN bus system. Under a bus system, the communication means and the terminal are connected permanently by a common communication line, and the sending and receiving of the communication signals takes place under a communications control arrangement. This allows the scope and expense of the cabling to be kept very small. As a particular trait of the CAN bus system, the communication signals are transmitted through at least two communication lines. The CAN bus is a widely used industry standard and offers the advantage of a standardized, stable and cost-effective structure.

In a further embodiment, a measurement time interval is reserved during operation, when the communication between the terminal and the communication means and/or between the communication means of at least two force-measuring modules is interrupted and the electrical voltage is measured. With the communication signals and measurements occurring at separate times, it is possible to keep them from interfering with each other.

In a further embodiment, at least one test voltage is applied to the communication line during the measurement of the voltage. By applying the test voltage, a defined change of the voltages is generated in the communication line, which allows a more accurate interpretation of the measurement values and thus an improved status determination.

The test voltage can be applied to the communication line by the terminal and/or by the communication means, possibly controlled by the terminal. Thus, the method can be used also in cases where a connection between the terminal and the communication means is compromised, disturbed or interrupted.

In a further embodiment, a functional failure of the at least one force-measuring module which has occurred or is to be anticipated, in particular a short circuit, is recognized by the communication means, whereupon the communication means is separated from the communication line and the determination of the measuring result is carried out with estimated and/or interpolated and/or extrapolated measurement values, possibly accompanied by a warning signal. This allows the weighing to be continued with a reduced accuracy. Depending on the required accuracy and on the importance of the failed force-measuring module, the results may still have an adequate level of accuracy.

Preferably, the measurement process is coordinated by the terminal or by the communication means, particularly in a way where the terminal or the communication means issues control commands for the timing to stop the communication signals and/or for the timing to apply a test voltage and/or for measuring the voltage of the at least one communication line and/or for the timing to continue the communication signals and/or for transmitting the measurement values and/or the results obtained from processing the measurement values. Thus, the entire timing in the method is synchronized under the control of the terminal.

In a further embodiment, the positive voltage and/or the negative voltage of the communication line are measured in relation to an electrical potential, in particular ground potential. This allows additional information to be gained about changes of the voltage potentials, whereby the network structure of the force-measuring device can be recognized and the accuracy of the status determination can be improved.

In a further embodiment, the voltage of the communication line is monitored, specifically the at least one measurement value and/or the results obtained from processing the latter are checked for conformance to at least one threshold value which can be predefined with a variable value, and if the threshold value has been found to be exceeded, actions are triggered, which specifically include transmitting messages and/or recalibrating or switching off the respective force-measuring module, and/or storing the at least one measurement value and/or the results obtained from processing the latter in a storage memory unit. This diagnostic function makes it possible to retroactively trace the measurement and events relating to the measurement. Furthermore, the transmission of data to the terminal can be strongly reduced, as only data pertaining to significant events are communicated.

The threshold values can be determined through theoretical calculations, taking into account in particular the resistances of the connecting conductor leads, the internal resistances of the communication means and the terminal resistances, and/or through at least one reference measurement. The reference measurement values can be obtained preferably from measurements in a newly installed and/or newly calibrated force-measuring device and stored in a memory unit. The reference values and/or threshold values can also be taken from manuals and operating instructions. In addition, they can also be specified by the manufacturer or transmitted to the installation from the manufacturer as needed. It is particularly advantageous to store the reference values and/or the threshold values in the individual force-measuring modules, whereby a modular interchangeability of the modules can be achieved.

This embodiment is suitable for arrangements of the force-measuring modules which have a simple and clear structure, because the threshold values can in this case be determined in a simple way. In a further embodiment, in which all module-connection cables have a largely identical conductor resistance, in particular largely identical lengths, materials and conductor cross-sections, the theoretical target values and threshold values are particularly easy to determine.

In a further embodiment, the communication means has the capability to switch by means of a switching device between at least one generator for a communication signal, in particular a CAN controller, and at least one generator for at least one test voltage. Thus, the switching is realized with minimal means, in particular if the switching device is controlled by a microprocessor, for example by the controller unit of the communication means.

Each force-measuring module can further have a device for determining and/or monitoring the voltage of the power supply, in particular the positive voltage and/or the negative voltage. This voltage can be referenced to a common potential, if available, in particular a ground potential (GND). These voltages allow valuable additional information to be gained about the condition of the force-measuring device.

In a further embodiment, at least two force-measuring modules are connected directly to each other by means of module-connection cable which serves to transmit the communication from one to the other. As a result, the overall length of the required connecting cables can be markedly reduced and the stability of the force-measuring device can be increased.

In a preferred embodiment, the force-measuring module includes a computing unit and a memory unit, wherein a program is executed in the computing unit which compares the value of the measured voltage to at least one threshold value which is predefined with a variable value in the memory unit and/or the computing unit. In addition, the force-measuring module preferably includes a memory unit where the measurement value that was found and/or the results obtained by processing it can be stored for further processing.

Preferably, the force-measuring device includes a time clock which is accessible to the computing unit, so that the program can assign a time value to each of the values being determined and store the value pair in the memory unit. This provides the possibility that potentially disruptive events can be traced back, and if a time sequence of voltage values is evaluated for example by a service technician, it is possible to retrace the history and gain information about the environment of the force-measuring device and possibly initiate measures to remove disturbances.

The understanding of the term "computing unit" encompasses all signal-processing elements such as analog circuits, digital circuits, integrated circuits, processors, computers and the like, which serve to compare the signals generated by the sensor to the values that have already been stored or set in the computing unit. These values, in particular maximum values, threshold values and usage limit values can come from the regulatory literature thus as national or international norm standards, they can be established from comparative measurements, or they can have been defined by the manufacturer of the force-measuring device. If necessary, the force-measuring device can also include a plurality of computing units; there can for example be a dedicated computing unit for each of the installed sensors.

If the force-measuring device has an output unit, in particular a display screen of an indicating- and operating unit and/or at least one light-emitting diode and/or a printer, a preferred method step is to deliver at the output unit a signal that depends on the measured voltage. Thus, a user of the force-measuring device is continuously informed about the ambient conditions in regard to disturbances of the voltages.

The term "output unit" stands of any analog or digital transmission-, reporting- and warning systems whereby the measurement values and/or sensor signals generated by the sensor and/or an output signal of the computing unit can be represented through suitable means such as sound, light, vibrations, electrical signals, electromagnetic pulses, numerical outputs and the like and transmitted to other instruments such as to further output devices, coordinating systems, terminals and the like. This output unit can therefore also be a transponder or transmitter which sends the sensor signals and/or output signals for example to a portable instrument. By means of the output unit, a warning can be given to the user, the event can be passed on to a memory unit, or it is even possible to directly alert the manufacturer or its service organization for example over the Internet.

If the at least one threshold value has been exceeded, the measurement is first repeated one or more times, particularly if the force-measuring device or a computing unit connected to the latter finds the voltage value to be of a magnitude where it would have an influence on the stability of the measurement signal. As an alternative or as a simultaneous measure, an alarm can be triggered and/or a measurement process can be interrupted and/or blocked. As another possible response of the electronic measurement unit or the force-measuring device, the readiness indication can be canceled. In regard to backward traceability, it is particularly advantageous if the value of the voltage is stored together with a time value in a log file of the memory unit.

If a calibration is pending in force-measuring devices with calibration capabilities, specifically weighing scales, the calibration will not be carried out right away if a threshold value has been exceeded, but will be postponed until the signal has subsequently returned below the threshold.

In an advantageous step of the method, the at least one sensor is monitored by checking the measurement values or sensor signals transmitted from it to the computing unit at least periodically in the computing unit through a comparison to verification values and verification tolerance values stored in the memory unit. If a deviation from the verification values is found or if given verification tolerance values have been violated, an error is registered and transmitted to an output unit. This increases the assurance provided by the method.

BRIEF DESCRIPTION OF THE DRAWINGS

Details of the force-measuring device, the force-measuring module and the method will be evident from the description of the examples of embodiments shown in the drawings, wherein identical parts are identified with identical part numbers and wherein:

FIGS. 3a through 3c show aligned time profiles of the signal voltage as a simplified example, with FIG. 3a showing the profile of the applied voltage, FIG. 3b showing the signal profile at the voltage sensor, and FIG. 3c showing the time segments of the communication, the measuring interval, and the points in time of the measurement;

FIGS. 4a and 4b depict a simplified representation of a further embodiment of the method according to FIG. 3, except that the communication takes place over a CAN bus connection, with FIG. 4a showing the profile of the two applied voltages, and FIG. 4b showing the signal profile of the two communication lines at the voltage sensor;

DETAILED DESCRIPTION OF THE PREFERRED EMBODIMENTS

Figure 1:
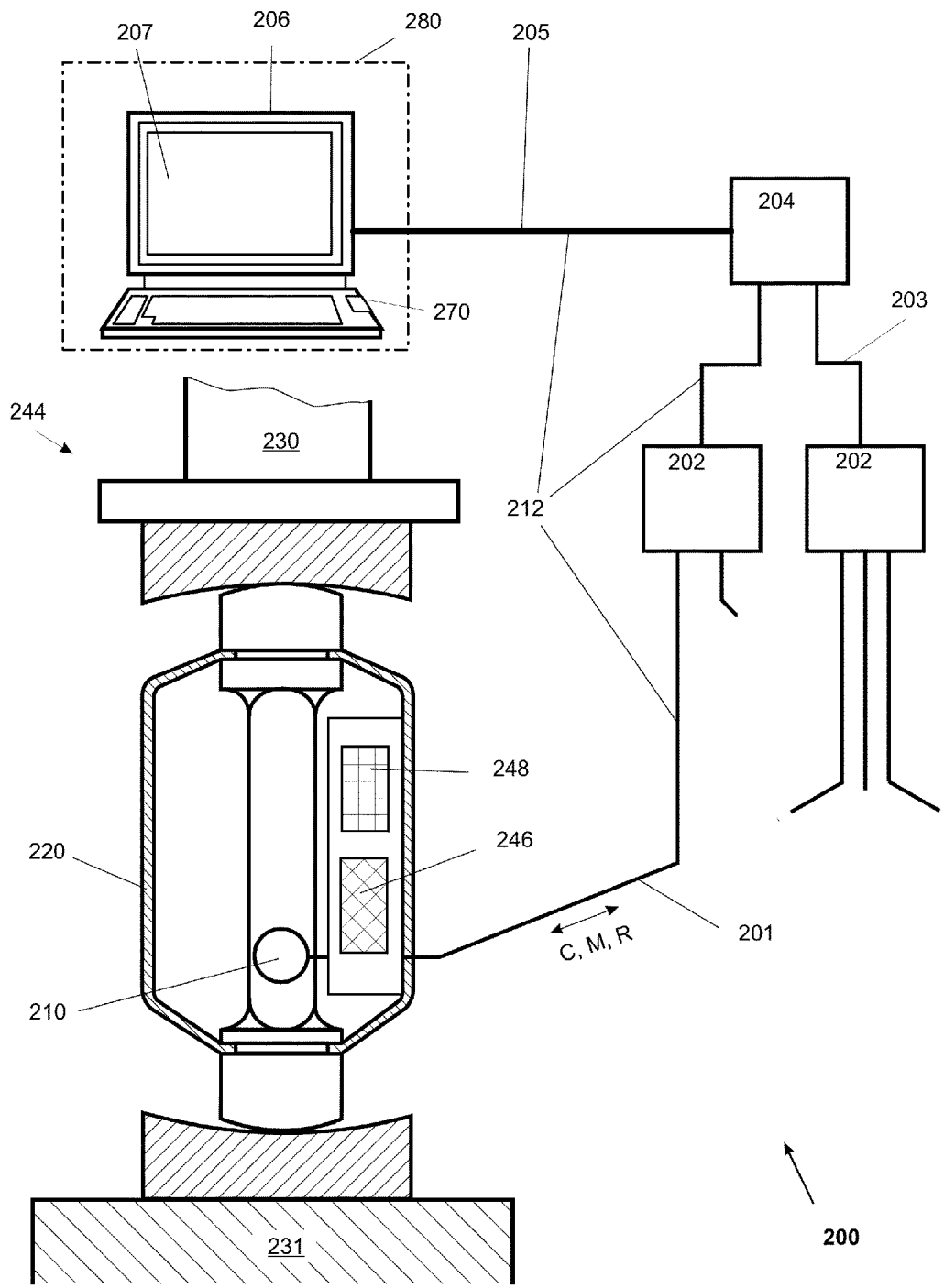
FIG. 1 schematically represents a force-measuring device which a force-measuring module shown in cross-section which includes a force-measuring cell and a communication means and which is connected to a terminal through a communication line.

FIG. 1 shows a force-measuring device 200 in the form of a tank-load weighing device. For the weighing of a container, a plurality of force-measuring modules 244 are arranged between the feet of the container 230 and the foundation 231, so that each foot of the container 230 rests on a force-measuring module 244. In order to determine the weight of the container and/or of its contents, the measurement values generated by the force-measuring modules 244 need to be added up, as each measurement value represents a part of the mass. To perform the addition, the measurement values of the individual force-measuring modules 244 are transmitted to a terminal 206, where they are processed and presented on the display 207. The terminal 206 is arranged in a remotely located controller device 280.

The force-measuring module 244 includes a force-measuring cell 210 which is enclosed in a housing 220. As a rule, the housing 220 is welded to the force-measuring cell 210 and tightly sealed against the ambient environment of the force-measuring device 200. In performing a measurement, the force-measuring cell 210 as well as the housing 220 are elastically compressed. The deformation of the force-measuring cell 210 is measured by means of the force-measuring cell 210, and the measurement values of the results from processing them are directed to a communication means 248.

The power to the force-measuring module 244, in particular to the associated electronic circuit, the force-measuring cell 210 and the communication means 248 is supplied through a power delivery means 246 which, in turn, is supplied with power P.

Each force-measuring module 244 is connected through a distributing line 201 to a distribution device 202. The distribution device 202, in turn, is connected through a segment cable 203 to a segment coupler 204. The segment coupler 204, finally, is connected through a terminal cable 205 to the controller device 280. The terminal cable, the so-called "home-run cable" bridges over the often major distance between the segment coupler 204 and the controller device 280 and thus establishes the direct connection to the terminal 280. The segment coupler 204 couples two independent, physically separated segments of the multiple force-measuring device 200 together. A segment is in each case formed by a measuring plate 240, the associated force-measuring modules 244, the distribution lines 201, the distribution device 202, and the segment cable 203.

This power supply unit 270 of the multiple force-measuring device 200 is arranged in the controller device 280 and incorporated in the terminal 206. The distribution of the power occurs through the terminal cable 205 the segment coupler 204, the segment cable 203, the distribution device 202, and finally through the distribution line 201 in the form of a current P to the power supply means 246 of the individual force-measuring modules 244.

In the same way, the communication means 248 of the force-measuring modules is connected to the terminal 206 in order to transmit the signals of the communication C, processed results R and measurement values M. However, the measurement values are transmitted in the opposite direction of the power supply, i.e. from the communication means 248 through the distribution line 201, the distribution device 202, the segment cable 203, the segment coupler 204, the terminal cable 205 to the terminal 206 in the controller device 280. The distribution line 201, the segment cable 203 and the terminal cable 205 are collectively referred to as communication line 212.

Figure 2B:
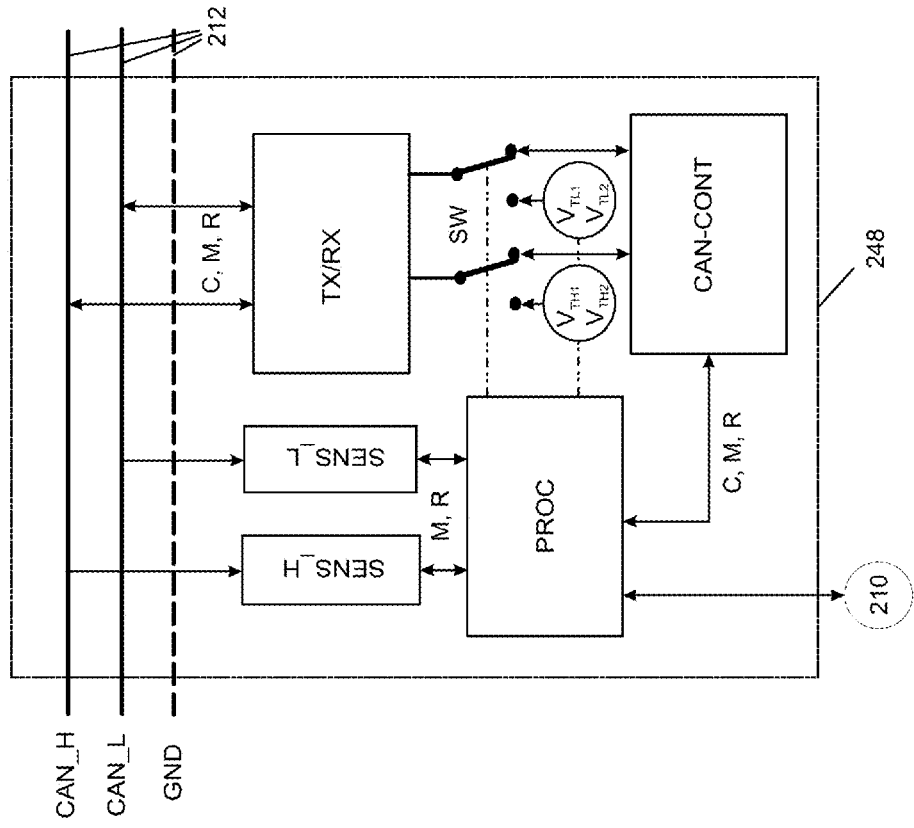
FIGS. 2a and 2b schematically depict two options for the communication means with a voltage sensor, with the communication line in FIG. 2a shown as a simple two-wire connection and the communications line in FIG. 2b shown as a CAN bus connection with a switching device.
Figure 2A:
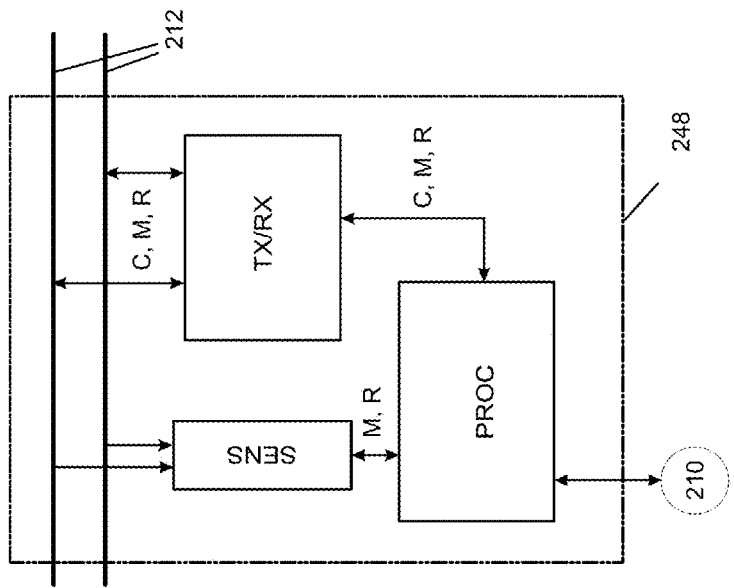

As examples for possible embodiments, a simple two-wire connection is shown in FIG. 2a and a CAN bus connection in FIG. 2b. Of course, many other possibilities of the transmission are also conceivable, in particular modulation methods with measurements of the carrier signals or measurements of the signal strength in optical signal transmissions.

The transmission of the measurement values M and/or of the processed results R of the latter to the terminal 206 can be sent either with a time offset through the communication line 212 that is being measured, or it can be sent simultaneously during the measurement through a specifically dedicated communication line 212, a radio connection or an optical connection.

FIG. 2a shows in a schematic representation an embodiment of the communication means 248, with a voltage sensor SENS which serves to measure the voltage $V_S$ between the communication lines 212. Instead of measuring the difference between the communication lines 212, it is also possible to measure the difference in potential between the communication line 212 and a ground potential.

The voltage sensor SENS is connected to a controller unit PROC, so that the control commands and the measurement values as well as processed results R can be exchanged between them. The sensor can be configured for example as a measurement device for the determination of a voltage drop through a resistor.

The controller unit PROC is further connected to the force-measuring cell in order to likewise exchange control commands and measurement values related to the force-measurements. The controller unit PROC is further connected to a sender- and receiver unit, a so-called transceiver TX/RX in order to send signals of the communication C, in particular measurement values M and/or results R obtained from processing them to the terminal 206, and/or to receive control commands from the terminal 206.

In an analogous representation as FIG. 2a, FIG. 2b shows an embodiment of the communication means 248 with two voltage sensors SENS_H, SENS_L which serve to measure the voltages $F_{SH}$ and $F_{SL}$ between various lines CAN_H and CAN_L of the communication line 212 and the ground potential GND. Instead of the ground potential GND, it is also possible to measure only the difference in potential between the lines CAN_H and CAN_L, although certain pieces of information can thereby get lost which are relevant for determining the condition of the force-measuring device 200.

In an analogous manner to FIG. 2a, the voltage sensors SENS_H and SENS_L are connected to a controller unit PROC. For the communication of the measurement values and/or the results obtained from processing them, there is in addition a controller CAN-CONT connected to the controller unit PROC. Thus, the communication always runs through this controller CAN-CONT and only afterwards through the transceiver TX/RX and the communication line 212 to the terminal 206.

The communication means 248 further includes a switching element SW which is controlled by the controller unit PROC, whereby the signal delivery of the transceiver TX/RX can be switched over. Thus it becomes possible to switch between the controller CAN-CONT and generators of the test voltages $V_T$. The test voltages $V_T$ are preferably constant and the generators can generate the test voltages $V_T$ under the control of the controller unit PROC at different points in time with different voltage values, for example $V_{TH1}$, $V_{TH2}$, $V_{TL1}$, and $V_{TL2}$. The switching element SW can be configured in many different ways, for example as a switch, as a relay, as a logic gate or as a microprocessor, or as a part of these circuit elements, in particular as a port of a microprocessor.

In a simplified representation, FIGS. 3a and 3b show the method of measuring the voltage along the time axis t with a communication means 248 according to FIG. 2a. FIG. 3a shows an example for the time profile of the voltage $V_T$ at the terminal 206 relative to a ground potential GND. FIG. 3b shows an example of the time profile of the voltage $V_S$ at the communication means 248 relative to a ground potential GND, and FIG. 3c shows the time segments of the communication $T_C$, the measurement interval $T_M$ and the measurement times $T_S$.

The measurements of the voltage sensor SENS are triggered by a control command of the controller unit PROC, and the measurement values determined in the process are again transmitted from the sensor SENS to the controller unit PROC. The individual points in time of the measurements can be transmitted from the terminal 206 to the controller unit PROC during a communication phase. The measurement values of the voltage sensor and/or the results obtained from processing them can be transmitted by way of the transceiver TX/RX and the communication line 212 to the terminal 206, possibly together with other data.

In a first phase, the control information is communicated during the communication time $T_C$ from the terminal 206 to the communication means 248. Thus, certain times $t_1$, $t_2$, $t_3$, $t_4$, $t_5$ can be defined to be synchronous for all force-measuring modules 244. The control information can mean for example that all communication means 248 are to set the time $t_1$ at 10 seconds after receiving the control information, the time $t_2$ three seconds later, the time $t_3$ two seconds later, etc. It is also conceivable that the times $t_1$, $t_2$, $t_3$, $t_4$, $t_5$ are realized through other forms of synchronization, for example by means of coherent time clocks, separate synchronizing lines, or through synchronized clocks.

At the time $t_1$, the time segment for the communication $T_K$ is interrupted and a measurement interval $T_M$ is started. Thus, the time profile of the voltage at the communication means 248 during the measurement time interval $T_M$ is not registered as a signal of a communication, but as a test voltage $V_T$.

In the embodiment according to FIG. 3, three defined test voltages $V_{T1}$, $V_{T2}$ and $V_{T3}$ are applied by the terminal 206 to the communication line 205 at the measurement times $t_2$, $t_3$, $t_4$ which are collectively shown in the drawing as $T_S$. The voltage at the measurement times $T_S$ is kept largely constant, while the voltage between the time points $T_S$ can take arbitrary values, in particular arbitrary transition voltages. These test voltages $V_{T1}$, $V_{T2}$, and $V_{T3}$ are preferably different from each other and cover as much as possible the entire voltage range of the communication signals.

The measurements of the voltage sensor SENS at the times $t_2$, $t_3$, $t_4$, collectively indicated as $T_S$, are triggered by control commands of the controller unit PROC. The measurement values of the voltages $V_{S1}$, $V_{S2}$ and $V_{S3}$ as determined by the voltage sensor SENS and/or the results obtained from processing them are subsequently transmitted from the voltage sensor SENS to the controller unit PROC. Finally, the measured values and/or the results obtained from processing them are transmitted through the communication line 205 to the terminal 206 during the communication phase $T_K$ and the condition of the force-measuring device 200 is determined from them.

A further embodiment of the force-measuring device 200 is illustrated in FIGS. 4a and 4b. The form of representation is analogous to FIG. 3, except that in this case the communication takes place as a data transmission by way of a CAN bus with the two communication lines CAN_H and CAN_L.

FIG. 4a shows an example of a time profile of the voltage $V_{TH}$ of the communication line CAN_H and an example of a time profile of the voltage $V_{TL}$ of the communication line CAN_L, referenced in both cases against a ground potential GND. These voltages can be applied by the terminal 206, but also by the communication means 248 of any force-measuring module. In the latter case the voltage sources $V_{TH}$ and $V_{TL}$ are connected into the circuit by the switching element SW of the communication means 248. In the illustrated embodiment, the measurements are made at the times $t_3$ and $t_4$. This is accomplished by connecting during the time $t_3$ the voltage $V_{TH1}$ to the communication line CAN_H and the voltage $V_{TL1}$ to the communication line CAN_L, and by connecting during the time t4 the voltage $V_{TH2}$ to the communication line CAN_H and the voltage $V_{TL2}$ to the communication line CAN_L.

FIG. 4b shows as examples a time profile of the voltage $V_{SH}$ in the communication line CAN_H and a time profile of the voltage $V_{SL}$ in the communication line CAN_L, in both cases referenced against a ground potential GND at a communication means 248 of a further force-measuring module 244. The measurement values of the voltages as determined by the sensors SENS_H and SENS_L provide the value for $V_{SH2}$ in the communication line CAN_H and $V_{SL2}$ in the communication line CAN_L at the time $t_2$ and the value for $V_{SHE}$ in the communication line CAN_H and $V_{SL3}$ in the communication CAN_L at the time $t_3$, in each case referenced against the ground potential GND (white arrows). As described above, it is also possible to make measurements without reference to the ground potential by directly measuring the difference in the potentials between the communication lines CAN_H and CAN_L, i.e. $\Delta_{VS2}$ at the time $t_2$ and $\Delta_{VS3}$ at the time $t_3$ (grey arrows). According to the procedure as described in the context of FIG. 3b, the measurement values and/or the results obtained from processing them are transmitted during the communication phase $T_C$ after the end of the measurement interval $T_M$, i.e. after the time $t_5$, through the communication line 212 to the terminal 206, and based on them the condition of the force-measuring device 200 is determined.

Figure 5:
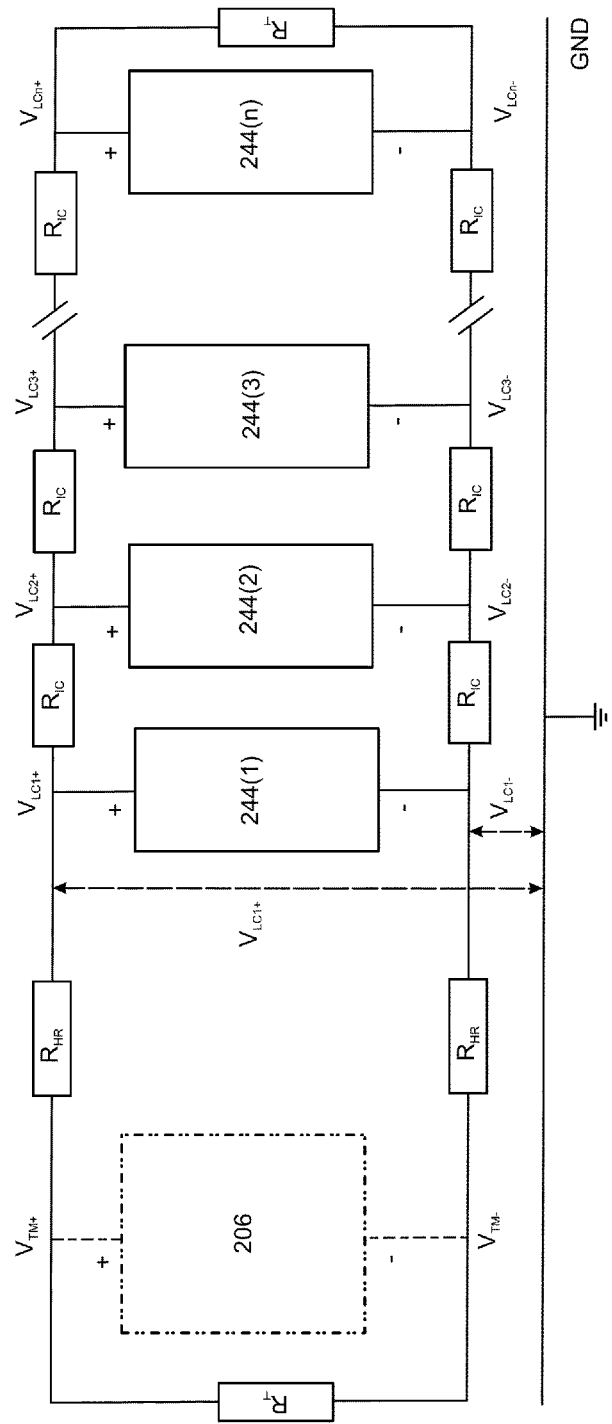
FIG. 5 is a simplified circuit schematic of the force-measuring device with a terminal, 1 to n force-measuring modules connected to each other in a chain-like manner, conductor resistances, termination resistances, electrical voltages, and a ground connection.

FIG. 5 shows a simplified block schematic of a force-measuring device 200 with a terminal 206 and 1 to n force-measuring modules 244(1) . . . 244(n), which are connected to each other so that they form a chain. The conductor line resistances $R_{HR}$ represent the conductor line resistance of the terminal cable 205, and the resistances $R_{IC}$ represent the conductor line resistance of the module-connection cable 250. The termination resistances $R_T$ function as terminations of the communication lines 212, which is advantageous particularly in the case of a bus configuration of the communication line 212. Also shown are the voltages $V_{LC1+}, \ldots V_{LCn+}, V_{LC1-}, \ldots, V_{LCn-}$ of the communication means 248, the voltages $V_{TM+}, V_{TM-}$ at the terminal 206 and of a common ground GND.

The conductor resistances $R_{HR}$, $R_{IC}$ represent the respective resistance values $R_{HR}$ of the terminal cable 205 and $R_{IC}$ of the module-connection cable 250. Accordingly, a positive voltage $V_{LCi+}$ and a negative voltage $V_{LCi-}$ of the communication lines 212 relative to the common ground potential can be measured at each force-measuring module 244(i), $1 \leq i \leq n$. These voltages are characteristic for each individual force-measuring module 244(1) . . . 244(n). The ground potential is set by the cable screen and/or by the housings of the force-measuring modules 244(1) . . . 244(n) and in particular by connecting the entire force-measuring device 200 to ground.

Preferably, the measured voltages $V_{LC1+}, \ldots, V_{LCn+}, \ldots, V_{LC1-}, \ldots, V_{LCn-}$ are compared to the expected values or to threshold values and/or tolerance values. When these values are exceeded, this is communicated to the terminal through specific signals. The terminal can trigger actions accordingly, such as alerting, informing or warning the user, or correcting the measurement values, or calibrating or adjusting the measuring device. As an example, if a present or impending functional failure of the force-measuring module, such as a short circuit, is recognized by the communication means, then several responses could result, including: separating the communication means from the communication line; determining the measuring result using an estimated, interpolated or extrapolated measurement value; and/or transmitting a warning message, if applicable.

Preferably, the measured voltages $V_{LC1+}, \ldots, V_{LCn+}, \ldots, V_{LC1-}, \ldots, V_{LCn-}$ are compared to the expected values or to threshold values and/or tolerance values. When these values are exceeded, this is communicated to the terminal through specific signals. The terminal can trigger actions accordingly, such as alerting, informing or warning the user, or correcting the measurement values, or calibrating or adjusting the measuring device.

In this embodiment, the conductor resistances $R_{IC}$ of the module-connection cables 250 are largely identical. This can be achieved through a suitable choice of the length, materials and conductive cross-section of the individual conductors in the module-connection cable 250. In this way, the values to be expected and the corresponding threshold values for the voltage $V_{LC1+}, \ldots, V_{LCn+}, \ldots, V_{LC1-}, \ldots, V_{LCn-}$ can be found through a simple calculation. In like manner, largely identical conductor resistance values $R_{HR}$ of the terminal cable 205 are achieved through a suitable choice of the leads of the terminal cable 205. However, a calculation of the values to be expected and of the threshold values can also be performed without a problem for conductor resistances of arbitrary magnitude.

Figure 6B:
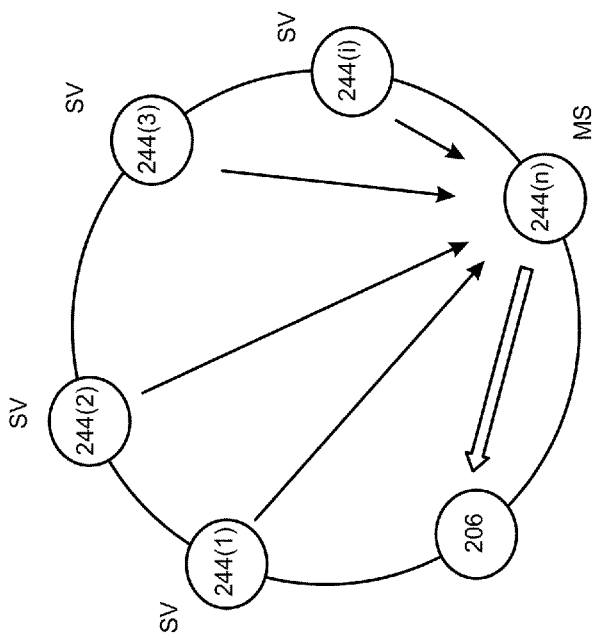
FIGS. 6a and 6b show the simplified block schematic of the force-measuring device with a terminal, 1 to n connected force-measuring modules, wherein one module functions as master, as represented by the second module in FIG. 6a and by the $n^{th}$ module in FIG. 6b.
Figure 6A:
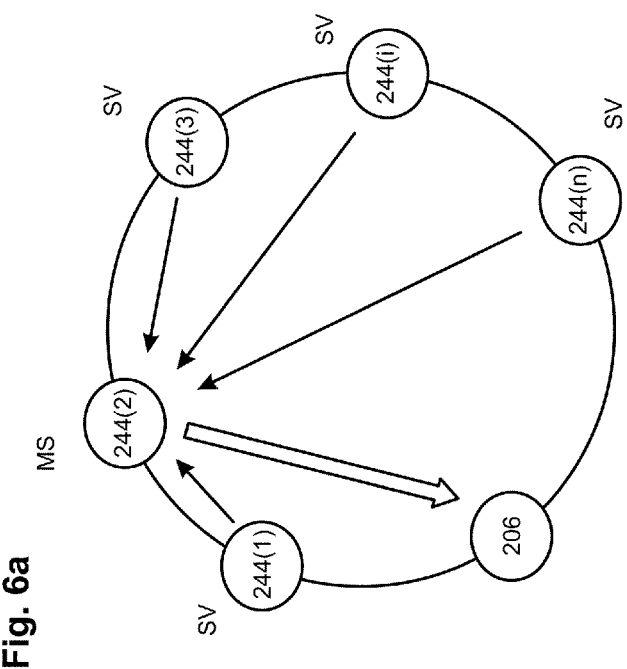

FIGS. 6a and 6b show a simplified schematic drawing of the force-measuring device with a terminal 206 and 1 to n force-measuring modules 244 which are connected to each other. One of the force-measuring modules 244 in this arrangement functions as master MS, while the other (n−1) force-measuring modules 244 function as slaves SV. During a test phase $T_M$, the master MS applies one or more test voltages $V_T$ to the communication lines 212. The voltage $V_S$ at the force-measuring modules 244 is measured by the slaves SV and at a later time during a communication phase $T_C$ transmitted to the terminal 206 or to the master MS (black arrow). FIG. 6a shows the second force-measuring module 244 acting as slave SV, and FIG. 6b shows the $n^{th}$ force-measuring module 244 acting as slave SV. Any of the force-measuring modules 244 can take on the function of master MS, typically under the control of the terminal 206. The collected and in some cases processed measurement values are transmitted from the master MS to the terminal 206 (white arrow). Furthermore, the terminal 206 itself can also take on the function of a slave SV in that it measures the voltages $V_{TM}$ at the terminal 206 and transmits the measurement values to the master MS.

In the embodiments described, the communication means 248 can, depending on the configuration of the force-measuring device 200 and the terminal 206, automatically transmit pertinent information to the terminal 206 either continuously or periodically and/or at random or after a change has occurred. Of course it is also possible that the terminal 206 interrogates the communication means 248 for information such as measurement values or measurement results either continuously or periodically and/or according to the principle of randomization.

The method can be performed by means of centralized and/or decentralized parts of a controller device of an installation, for example with the terminal 206 and/or the connection unit 201 and/or the force-measuring module 244, which are for this purpose equipped with the appropriate operating programs. However, it is also possible to divide the tasks between different levels of the process control. Through appropriate measures, the method can thus be implemented on any single-level or multi-level installations at little cost. The terminal 206 and/or the connection unit 201 can also be installed in a mobile instrument which can, through radio connections, call for individual measurement values and/or measurement results. For the radio communication, the individual force-measuring modules 244 can be given an identification code, as is known and being practiced in state-of-the-art solutions for many applications.

The examples of embodiments presented in the description are not meant to imply that the present invention is limited to arrangements with only one force-measuring cell in only one force-measuring module. As those of ordinary knowledge in the pertinent art will understand, the invention can be used likewise in arrangements containing at least two weighing cells in a force-measuring module.

Furthermore, it is of no consequence in regard to the subject of the invention, how the measurements and warnings are coordinated chronologically. Messages/warnings can occur in real time as well as with a time offset relative to the measurements.

What is claimed is:

1. A method for determining the condition of a weighing device with at least one force-measuring module comprising a force-measuring cell and a communication means, with a terminal and with at least one communication line through which communication signals are transmitted between the communication means and the terminal, comprising the steps of:

measuring at least once the electrical voltage of the at least one communication line, using a voltage sensor, during a measurement time interval that is set aside during operation of the weighing device, by interrupting communication over the at least one communication line between the communication means and the respective terminal or communication means of the further force-measuring module;

generating a measurement value from the measured voltage, and, optionally, generating a processed result from the measurement value;

transmitting, by way of the at least one communication line, a measurement signal, comprising the measurement value and, if applicable, the processed result thereof; and determining, at a receiver, a parameter representing the condition of the force-measuring device, based upon the measurement signal, the receiver being at least one of: the terminal and the communication means of a further force-measuring module.

2. The method of claim 1, wherein:
the transmitting step is accomplished by means of a bus system.

3. The method of claim 1, wherein:
the measuring step comprises the substep of applying at least one test voltage to the communication line during the voltage measurement.

4. The method of claim 3, wherein:
the application of the at least one test voltage is accomplished under the control of the terminal.

5. The method of claim 1, comprising the step of:
recognizing, in the communication means, a present or impending functional failure of the force-measuring module; and
if a functional failure is recognized, responding thereto by:
    separating the communication means from the communication line;
    determining the measuring result using an estimated, interpolated or extrapolated measurement value; and
    transmitting a warning message, if applicable.

6. The method of claim 1, wherein:
the measuring step is controlled chronologically in at least one of: the terminal and the communication means, by the substeps of:
    generating a control command to interrupt the communication signals;
    generating a control command to apply the at least one test voltage and measure the voltage of the at least one communication line in response thereto; and
    generating a control command to resume the communication signals.

7. The method of claim 1, wherein:
in the measuring step, the communication line voltage is measured with reference to a ground potential.

8. The method of claim 1, wherein:
the parameter determining step comprises the substeps of:
    monitoring the communication line voltage;
    examining, with regard to conformance with at least one predefined threshold value, the received measurement value and, if applicable, the processed results; and
    if any of the threshold values are exceeded, triggering at least one of the following:
        transmitting a message;
        recalibrating the force-measuring module;
        switching off the force-measuring module; and
        storing the received measurement value and, if applicable, the processed results, in a memory unit.

9. The method of claim 8, further comprising the step of:
determining the at least one threshold value by means of at least one of:
    theoretical calculations that account for the conductor resistances of the connecting lines, the internal resistances of the communication means and the termination resistances; and
    at least one reference measurement.

10. The method of claim 1, wherein:
the measuring step further comprises the substep of switching a switching device in the communication means between a generator of a communication signal and a generator of at least one test voltage.

11. A weighing device, comprising:
a force-measuring module, comprising:
    a force-measuring cell; and
    a communication means;
a terminal;
at least one communication line connecting the communication means with the terminal;
a voltage sensor, arranged to:
    measure the electrical voltage of the at least one communication line during operation; and
    generate and transmit to the terminal through the communication line, a measurement signal value based on the measured voltage, the measurement signal comprising the measurement value and, if applicable a processed result; and
means, in the terminal, for receiving the measurement signal and determining the condition of the force-measuring device from the measurement signal.

12. The weighing device of claim 11, wherein:
there are at least two communication lines between the terminal and the communication means, configured as a bus system.

13. The weighing device of claim 11, wherein:
at least two force-measuring modules are connected directly to each other through a module-connection cable which serves to continue the transmission path of the communication.

14. The weighing device of claim 11, further comprising:
a power supply; and
in each force-measuring module, a device that determines and, optionally, monitors, the voltage of the power supply relative to an electrical potential.

15. The weighing device of claim 11, wherein:
all module-connection cables are substantially matched in terms of conductor resistance values with relation to length, material and conductor cross-section.

16. A force-measuring module for a weighing device, adapted for communication to a terminal through at least one communication line, the module comprising:
a force-measuring cell;
a communication means, adapted for connection to each of the at least one communication lines; and
a voltage sensor, arranged to:
    measure an electrical voltage of the communication line during operation;
    generate a measurement value from the measured voltage, and, optionally, generate a processed result from the measurement value; and
    transmit the measured value and, if applicable, the processed result through the communication line.

17. The force-measuring module of claim 16, wherein:
the communication means is adapted for connection to the terminal through at least two communication lines configured as a bus system.

18. The force-measuring module of claim 16, further comprising:
a means, located at the communication means, for switching between a generator of a communication signal and at least one generator of at least one test voltage.

19. The method of claim 2, wherein:
the bus system is a CAN-bus system.

20. The method of claim 10, wherein:
the generator of a communication signal is a CAN controller.

21. The weighing device of claim 12, wherein:
the communication lines are configured as communication lines for a CAN bus system.

22. The weighing device of claim 14, wherein:
the voltage of the power supply is determined and, optionally, monitored, relative to ground potential.

23. The force-measuring module of claim 17, wherein:
the communication lines are configured for a CAN bus system.

24. The force-measuring module of claim 18, wherein:
the generator of a communication signal is a CAN controller.

* * * * *